US012710275B2

(12) United States Patent
Chugh et al.

(10) Patent No.: US 12,710,275 B2
(45) Date of Patent: Aug. 18, 2026

(54) AUTOMATED MAPPING FOR AUTONOMOUS VEHICLE NAVIGATION

(71) Applicant: Zoox, Inc., Foster City, CA (US)

(72) Inventors: Samir Chugh, San Francisco, CA (US); Christopher James Gibson, Belmont, CA (US); Byungil Jeong, San Ramon, CA (US); Timothy Robert Stolzenfeld, Brookline, MA (US)

(73) Assignee: Zoox, Inc., Foster City, CA (US)

( * ) Notice: Subject to any disclaimer, the term of this patent is extended or adjusted under 35 U.S.C. 154(b) by 129 days.

(21) Appl. No.: 18/592,318

(22) Filed: Feb. 29, 2024

(65) Prior Publication Data

US 2025/0277664 A1 Sep. 4, 2025

(51) Int. Cl.
*G01C 21/30* (2006.01)
*G06V 20/56* (2022.01)

(52) U.S. Cl.
CPC ........... *G01C 21/30* (2013.01); *G06V 20/588* (2022.01)

(58) Field of Classification Search
CPC .............................. G01C 21/30; G06V 20/588
See application file for complete search history.

(56) References Cited

U.S. PATENT DOCUMENTS

| | | | | |
|---|---|---|---|---|
| 10,832,439 | B1 * | 11/2020 | Ma | G05D 1/0274 |
| 11,760,381 | B1 | 9/2023 | Gray | |
| 12,373,689 | B2 * | 7/2025 | Park | G06V 20/58 |
| 2001/0012981 | A1 * | 8/2001 | Yamashita | G05D 1/0274 701/410 |
| 2012/0065878 | A1 | 3/2012 | Yeh et al. | |
| 2018/0033148 | A1 * | 2/2018 | Zheng | G06V 20/588 |
| 2018/0204075 | A1 * | 7/2018 | Kumano | G06V 20/588 |
| 2018/0321046 | A1 | 11/2018 | Titze et al. | |
| 2023/0298362 | A1 * | 9/2023 | Zhang | G06T 7/12 382/103 |
| 2024/0425056 | A1 * | 12/2024 | Eriksson | G06V 20/588 |

FOREIGN PATENT DOCUMENTS

| | | |
|---|---|---|
| JP | 2004271814 A | 9/2004 |
| KR | 20230087112 A | 6/2023 |

OTHER PUBLICATIONS

Search Report and Written Opinion for International Application No. PCT/US25/16815, Dated Jun. 9, 2025, 9 pages.

* cited by examiner

*Primary Examiner* — Navid Z. Mehdizadeh
*Assistant Examiner* — Matthew Ho
(74) *Attorney, Agent, or Firm* — Lee & Hayes, P.C.

(57) ABSTRACT

Techniques for generating (e.g., creating and/or updating) map data associated with an environment based on sensor data. An example system may determine (e.g., based on the sensor data) and/or receive an indication of a lane boundary associated with a path. The system may determine, based on a set of drivable areas associated with the path, a polygon. The system may determine a representative line associated with the polygon and determine a set of points along the representative line. The system may determine a set of intersections of a set of lines that originate at the set of points and extend laterally from the representative line. The system may determine, based on the set of intersections, a representation of the lane boundary and associate the representation with the map data.

19 Claims, 5 Drawing Sheets

Receive sensor data
302

Determine a polygon based on a drivable area
304

Determine a representative line
306

Determine a set of points along the representative line
308

Determine lines perpendicular to the points
310

Determine intersecting points
312

Determine a cluster associated with a first lane marking
314

Determine a cluster associated with a second lane marking
316

Determine a representation associated with the first marking
318

Determine a representation associated with the second marking
320

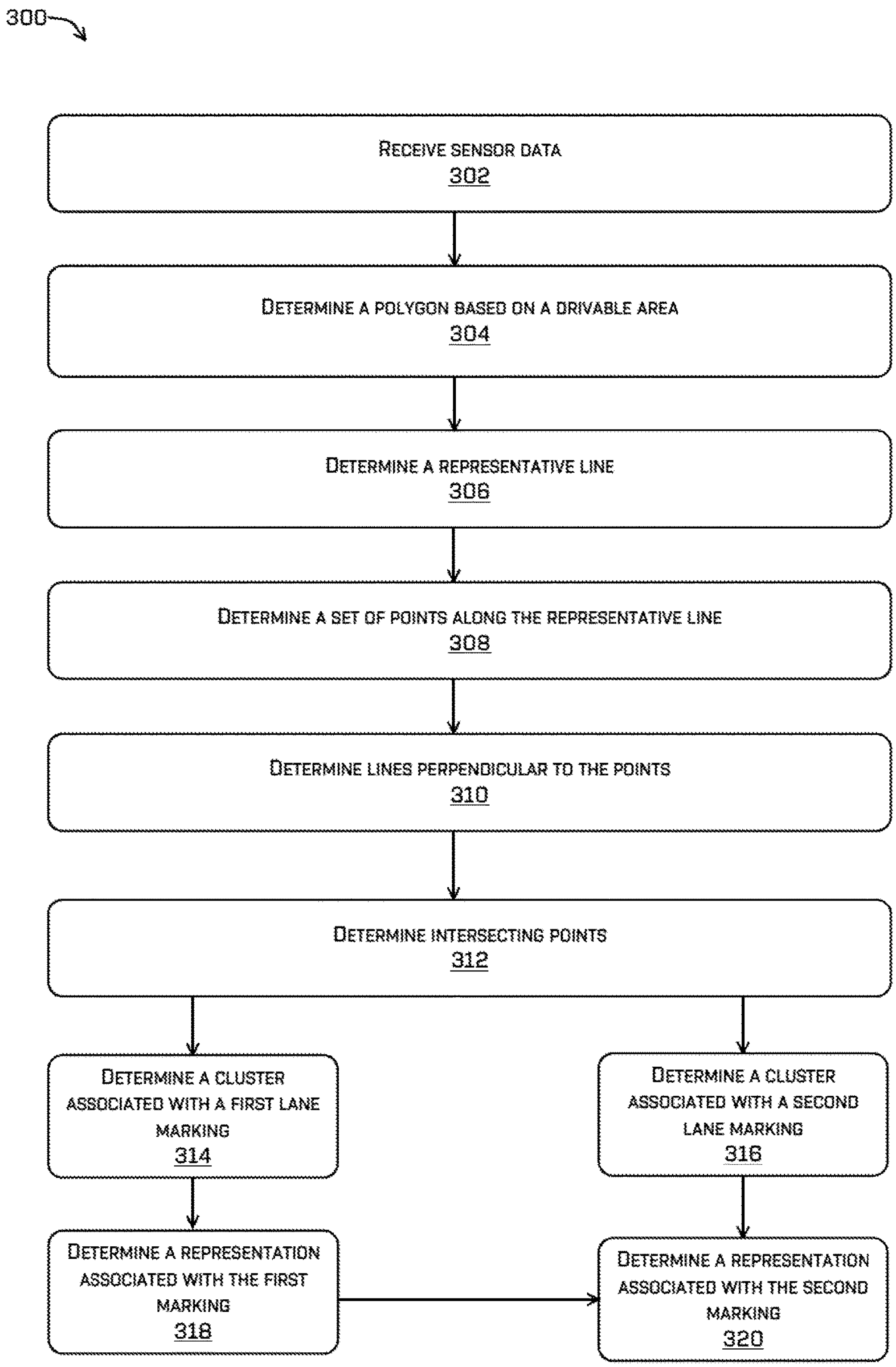

FIG. 3

AUTOMATED MAPPING FOR AUTONOMOUS VEHICLE NAVIGATION

BACKGROUND

A map of an environment may include information that is usable by a vehicle when performing different operations. For example, a map may include information indicating various types of drivable surfaces, non-drivable surfaces, lane markings, etc., and when planning motion through the environment, a vehicle may reference the map to determine a path, speed, etc. As such, accurate and robust map data can contribute to the vehicle executing maneuvers that efficiently and effectively use drivable surfaces, non-drivable surfaces, and/or lane markings.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is a flowchart diagram of an example process for determining a primary lane marking representation and a secondary lane marking representation based on sensor data associated with an environment.

DETAILED DESCRIPTION

Figure 1:
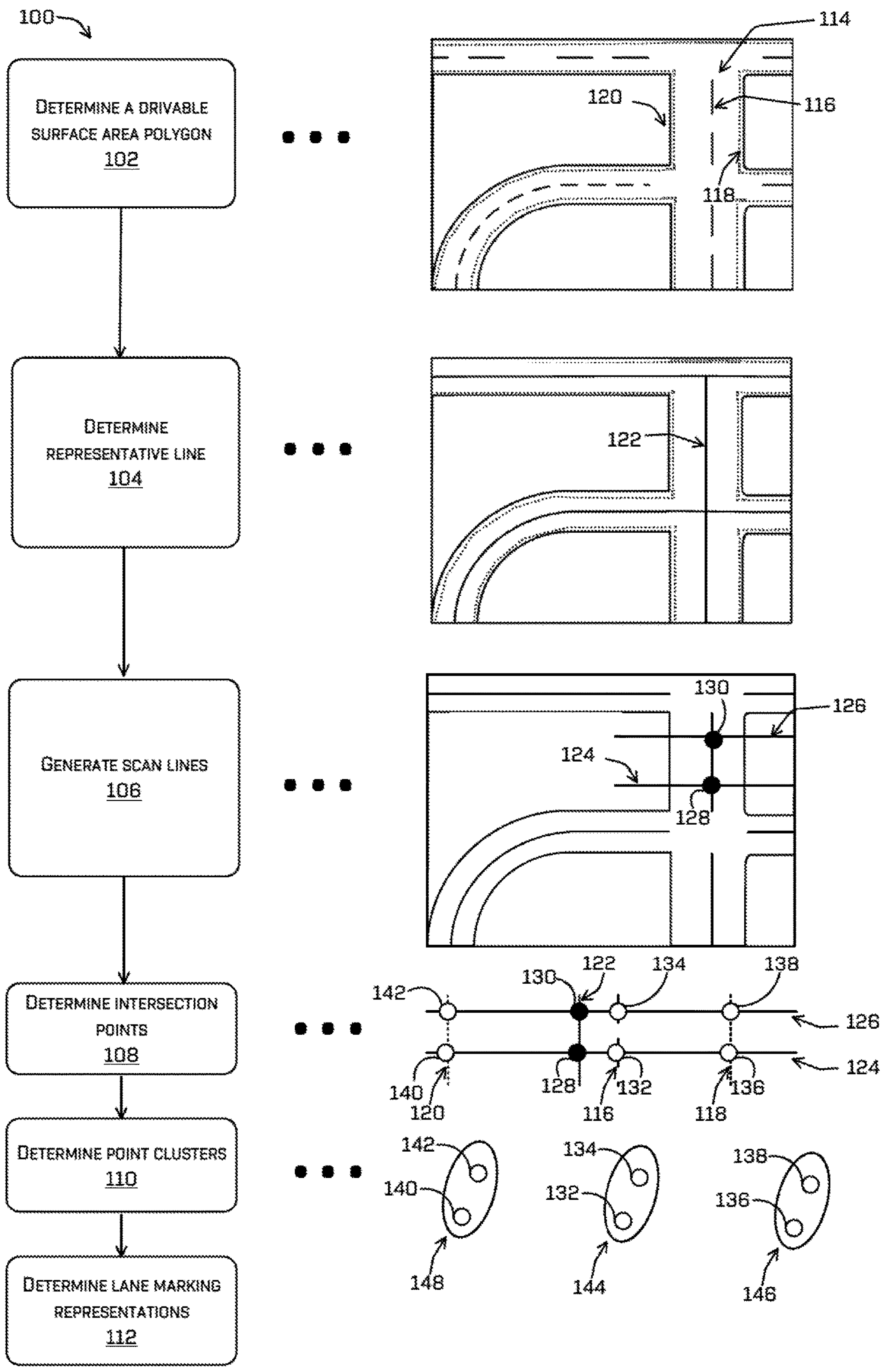
FIG. 1 is a flowchart diagram of an example process for determining a set of lane marking representations based on sensor data associated with an environment.

Techniques for generating (e.g., creating, updating, and/or the like) map data associated with an environment are described herein. In some cases, an example system may use map data generated in accordance with the techniques described herein to control the operation of one or more vehicles, such as one or more autonomous vehicles. For example, the system may receive a request to travel to a destination location using an autonomous vehicle. Based on (e.g., in response to) receiving the request, the system may determine a route and/or path for navigating from a current location associated with the autonomous vehicle and/or with the requesting user to the destination location. The system may additionally control the operation of the autonomous vehicle based on the determined route and/or path. In some cases, an example system may display map data on a computer device (e.g., on a smartphone device) and/or using the display device associated with a vehicle (e.g., using a navigation software associated with a vehicle). The map data may be generated by the computer device, the vehicle, and/or a remote computing resource (e.g., fleet management computing device or the like) in accordance with the techniques described herein using a software application executed. While various techniques described herein are described with reference to performing operations on a lane marking, a person of ordinary skill in the relevant technology will recognize that the operations described herein may be performed on any lane boundary (e.g., center lane boundary, road boundary, and/or the like), such as on lane boundaries that are not associated with markings.

In some cases, the techniques described herein include generating map data associated with an environment (e.g., associated with a geographic area) based on sensor data associated with that environment. For example, in some cases, an example system may receive sensor data associated with one or more vehicles traversing the environment along a path. The system may additionally determine (e.g., based on the received sensor data) and/or receive an indication of a lane marking associated with the path. The system may then determine, based on a set of drivable areas detected while traversing the path, a polygon. The system may then determine a representative line (e.g., a medial axis) associated with the polygon and determine a set of points along the representative line. The system may then determine a set of intersections of a set of lines that originate at the set of points and extend laterally from the representative line with the set of points along the representative line. The system may then determine, based on the set of intersections, a representation of the lane marking and associate the representation with the map data. The representative line may be a reference line.

In some cases, the techniques described herein include receiving sensor data associated with an environment. The sensor data may include data captured by one or more sensors associated with a vehicle traversing the environment along a path. In some cases, the sensor data may represent road geometry data indicating one or more drivable surface areas in the environment and along the path. The drivable surface areas may include one or more drivable areas (e.g., roads, junctions such as intersections), merge points, and/or the like) one or more lane boundaries, and/or one or more lane markings. The sensor data may include an indication of a lane marking in the environment. Sensor data may include and/or be determined based on data by one or more image sensors (e.g., camera systems), lidar systems, radar systems, ultrasonic sensors, localization systems, and/or the like.

In some cases, the road geometry data may be determined by processing raw sensor data associated with the environment (e.g., raw sensor data captured by one or more vehicle sensors) using a machine learning model. The machine learning model may be configured to process the raw sensor data (e.g., lidar point clouds captured by one or more lidar sensors, image data captured by one or more image sensors, radar data captured by one or more radar sensors, and/or the like) to detect the drivable surface areas. Detecting drivable surface areas based on sensor data may be performed in accordance with the techniques described in U.S. patent application Ser. No. 15/820,245 entitled "Sensor Data Segmentation" filed on Nov. 21, 2017, the entire contents of which are hereby incorporated by reference for all purposes. The machine learning model may be a supervised machine learning model that is trained based on raw sensor data associated with annotated drivable surface areas, such as annotated drivable surface areas that have been delineated and labeled by one or more human users.

In some cases, the techniques described herein include determining a polygon based on at least a subset (e.g., all or a portion) of the drivable surface areas associated with an environment (e.g., the drivable surface areas represented by sensor data associated with one or more vehicles). An example system may generate the polygon based on a union of the drivable surface areas. The polygon may thus include all of the drivable surface areas associated with the environment and/or all of the drivable surface areas associated with the environment along the path, for example. In some cases, a polygon may include a union of the drivable surface areas detected based on first sensor data (e.g., captured by sensor(s) associated with a first vehicle) and the drivable surface areas detected based on second sensor data (e.g., captured by sensor(s) associated with a second vehicle). However, while various implementations of the techniques described herein include determining a polygon based on at least a subset of the drivable surface areas associated with an environment, a person of ordinary skill in the relevant technology will recognize that the techniques described herein may include determining one or more other geometric shapes based on the drivable surface areas associated with the environment.

In some cases, a polygon associated with a set of drivable surface areas is determined by performing a union operation based on one or more discrete sub-polygons, where a sub-polygon may be associated with one of the drivable surface areas. In some cases, the discrete sub-polygon(s) are determined based on output data associated with a perception model. In some cases, the discrete sub-polygons are buffered by a distance (e.g., by a configurable distance) prior to performing the union operation to bridge minor gaps arising between the discrete sub-polygon(s). The buffering operation may include expanding the boundaries of the discrete sub-polygon(s) outward by a defined number of spatial units (e.g., by a defined number of pixels). This expansion may be performed using an image processing technique such as morphological dilation. In some cases, the discrete sub-polygons are buffered prior to performing the union operation to bridge one or more gaps arising between the discrete sub-polygon(s). The buffering operation may be performed in the three-dimensional space, for example using a Minkowski addition operation. This approach may expand the boundaries of the discrete sub-polygon(s) outward by a defined distance to fill one or more gaps between surfaces.

In some cases, the techniques described herein include determining a representative line associated with a polygon determined based on the drivable surface areas associated with an environment. In some cases, the representative line associated with a polygon may be a line that extends along at least a portion (e.g., all or less than all) of the polygon. In some cases, the representative line is substantially around a lateral center of the polygon. For example, the representative line may be a medial axis of the polygon.

In some cases, the medial axis of a polygon may be determined based on a Voronoi diagram associated with the polygon. In some cases, to determine a medial axis of a polygon based on the Voronoi diagram associated with the polygon, an example system may compute the Voronoi diagram associated with the polygon, for example by partitioning the polygon into a set of regions based on (e.g., as defined by) the proximity of the regions and/or based on proximity of points associated with the polygon to the vertices associated with the polygon. The system may then identify the diagram edges that intersect with the polygon boundary and determine the medial axis based on the identified edges. In some cases, if two or more Voronoi diagram edges overlap and/or intersect each other along the polygon boundary, the system may merge the overlapping and/or intersecting diagram edges into a single edge prior to determining the medial axis based on the diagram edges that intersect with the polygon boundary.

In some cases, the representative line associated with a polygon represents a longitudinal axis of the polygon. In some cases, the representative line associated with a drivable surface area polygon represents a skeleton of the polygon. In some cases, a polygon's skeleton may be defined based on a centralized line equidistant from the polygon's edges that represents the polygon's shape and/or topology.

In some cases, the representative line associated with a polygon may be one of multiple (e.g., two or more) discontinuous line segments associated with a set of drivable surface areas, such as two or more discontinuous line segments determined by removing one or more line segments associated with one or more junction areas (e.g., associated with one or more intersections) from a continuous line segment. In some cases, after determining a continuous representative line associated with a polygon, the discontinuous representative lines may be determined by removing one or more line segments associated with one or more junction areas from the continuous representative line. In some cases, one objective behind removing the line segments associated with junction areas may be to generate representations associated with lane markings that correspond to non-junction drivable surface areas only. Removing line segments associated with the junction areas from the polygon's representative line may be one technique among multiple techniques used by an example system to exclude lane markings associated with junction areas from a dataset before determining lane marking representations. Examples of other techniques for removing lane markings associated with junction areas are described in greater detail below. In some cases, the representative line extends along all of the polygon including the junction areas (e.g., intersections).

In some cases, the representative line may contain one or more artifacts that branch out laterally from the main longitudinal body of the representative line. In some cases, such artifacts are filtered out. This filtering operation(s) may be performed, for example, by clustering the line segments geometrically based on proximity and/or relative heading measures, and/or by finding the shortest path along the representative line from one junction to another junction and removing line segments that deviate from this shortest path.

In some cases, the techniques described herein include determining one or more lines that extend laterally (e.g., in a direction that is perpendicular to the direction associated with the representative line) from one or more points associated with a representative line (e.g., a representative line associated with a segment of a drivable surface area polygon). In some cases, a line that extends laterally from a point associated with a representative line is referred to herein as a "scan line." In some cases, a scan line originates from a point associated with (e.g., on) the representative line and extends laterally in one or both directions.

In some cases, to determine a set of scan lines associated with a representative line, an example system determines a set of points associated with the representative line. The set of points may, for example, be determined based on a set of fixed intervals along the representative line. In some cases, to determine the set of points associated with the representative line, the system determines a sequence of points, where the distance between two successive points in the sequence may be determined based on a predefined value (e.g., a parameter associated with the system).

In some cases, the techniques described herein include determining a set of scan line intersection points associated with a set of scan lines (e.g., a set of scan lines associated with a drivable surface area polygon). In some cases, a scan line intersection point is a point associated with an intersection of a scan line with a lane marking. In some cases, after determining the set of scan lines, an example system determines each point of intersection of the scan lines with the estimated positions of one or more lane markings associated with the corresponding drivable surface areas. This operation may result in a set of scan line intersection points. The estimated lane marking position(s) may be determined based on sensor data associated with a corresponding environment.

In some cases, given N scan lines associated with a drivable polygon area representative line (e.g., a representative line associated with a non-junction drivable surface area) and given M detected lane markings (e.g., three lane markings for a two-lane road) associated with the corresponding drivable surface area, an example system determines N*M scan line intersection points. Each of the N*M scan line intersection points may be a point associated with the intersection of a respective one of the N scan lines with a respective one of the M detected lane markings. In some cases, to determine the intersection of a scan line with an estimated position of a lane marking, an example system may determine whether the shortest lateral distance between the scan line and a set of points associated with a set of lane markings associated with a drivable surface area falls below a threshold. In some cases, if this shortest lateral distance falls below the lateral distance threshold, the system may determine a scan line intersection point based on the lane marking point that is associated with the shortest lateral distance.

For example, an example system may receive data representing N=4 scan lines extending laterally from four points associated with the representative line of a drivable surface area polygon, and M=3 lane markings (e.g., a center lane marking, a right boundary lane marking, and a left boundary marking) associated with the corresponding drivable surface area. In some cases, the system may determine at least one of the following twelve scan line intersection points: a point associated with the intersection of a first scan line with a first lane marking (e.g., the right boundary lane marking), a point associated with the intersection of a second scan line with the first lane marking, a point associated with the intersection of a third scan line with the first lane marking, a point associated with the intersection of a fourth scan line with the first lane marking, a point associated with the intersection of a first scan line with a second lane marking (e.g., the center lane marking), a point associated with the intersection of a second scan line with the second lane marking, a point associated with the intersection of a third scan line with the second lane marking, a point associated with the intersection of a fourth scan line with the second lane marking, a point associated with the intersection of a first scan line with a third lane marking (e.g., a left boundary lane marking), a point associated with the intersection of a second scan line with the third lane marking, a point associated with the intersection of a third scan line with the third lane marking, and a point associated with the intersection of a fourth scan line with the third lane marking. In some cases, the number of intersection points associated with a representative line may be determined based on the curvature of the representative line. For example, in some cases, the higher the representative line's curvature, the higher the number of intersection points.

In some cases, after determining a set of scan line intersection points, an example system updates this set by removing a subset of the scan line intersection points that are determined to be associated with a junction area. In some cases, the system determines whether a scan line intersection point is associated with a junction area based on a deviation between: (i) a curvature measure (e.g., a tangent line slope, a heading-invariant orientation measure, and/or the like) associated with the scan line intersection point, and (ii) one or more curvature measures associated with one or more other scan line intersection points associated with the same scan line. In some cases, if the deviation falls above a threshold, the system may determine that the scan line intersection point is associated with a junction area. In some cases, if the system determines that scan line intersection point is associated with a junction area, the system may remove the scan line intersection point from the determined set of scan line intersection points.

For example, an example system may receive data representing that a particular scan line intersects with a first lane marking (e.g., a right boundary lane marking) associated with a drivable surface area at a first point $P_1$, with a second lane marking (e.g., a center lane marking) associated with the drivable surface area at a second point $P_2$, and with a third lane marking (e.g., a left boundary lane marking) associated with the drivable surface area at a third point $P_3$. The system may further receive data representing that $P_1$ is associated with a first curvature measure $C_1$ (e.g., a first tangent line slope), $P_2$ is associated with a second curvature measure $C_2$, and $P_3$ is associated with a third curvature measure $C_3$. The system may further determine at least one of the following: (i) that a deviation between $C_1$ and $C_2$ exceeds a threshold (e.g., that $|C_1-C_2|$ exceeds a threshold), or (ii) that a deviation between $C_2$ and $C_3$ exceeds a threshold (e.g., that $|C_2-C_3|$ exceeds a threshold). In some cases, based on the noted determination, the system may determine that $P_1$, $P_2$, and $P_3$ are associated with a junction area. The system may then remove the $P_1$, $P_2$, and $P_3$ from a set of scan line intersection points associated with the corresponding drivable surface areas. In some cases, the system may provide a buffer around a region associated with one or more scan line intersection points that are determined to be associated with junctions.

As another example, an example system may receive data representing that a particular scan line intersects with a first lane marking (e.g., a right boundary lane marking) associated with a drivable surface area at a first point $P_4$, with a second lane marking (e.g., a center lane marking) associated with the drivable surface area at a second point $P_5$, and with a third lane marking (e.g., a left boundary lane marking) associated with the drivable surface area at a third point $P_6$. The system may further receive data representing that $P_4$ is associated with a first curvature measure $C_4$ (e.g., a first tangent line slope), $P_5$ is associated with a second curvature measure $C_5$, and $P_6$ is associated with a third curvature measure $C_6$. The system may further determine at least one of the following: (i) that a deviation between $C_4$ and $C_5$ falls below a threshold (e.g., that $|C_4-C_5|_{falls\ below}$ a threshold), or (ii) that a deviation between $C_5$ and $C_6$ falls below a threshold (e.g., that $|C_5-C_6|$ falls below a threshold). In some cases, based on the noted determination, the system may determine that $P_4$, $P_5$, and $P_6$ are not associated with a junction area. The system may then maintain the $P_4$, $P_5$, and $P_6$ in a set of scan line intersection points associated with the corresponding drivable surface areas.

In some cases, the techniques described herein include determining a set of lane markings based on a set of scan line intersection points (e.g., based on a set of points associated with intersections of a set of scan lines extending laterally from a representative line of a drivable surface area polygon with a set of lane marking detections associated with the corresponding drivable surface area). In some cases, to determine a set of lane markings based on a set of scan line intersection points, an example system may determine one or more clustering operations based on the set of scan line intersection points. In some cases, given L clusters, the system determines L lane markings. Each of the L lane markings may be determined based on the scan line intersection points in a respective one of the L lane markings.

In some cases, an example system clusters a set of scan line intersection points, for example a set of scan line intersection points determined by removing those points that are determined to be associated with one or more junction areas from an original set of scan line intersection points. In some cases, to cluster the set of scan line intersection points, the system maps each of the scan line intersection points to a clustering space (e.g., a multi-dimensional clustering space). The clustering space may be associated with a set of dimensions, such as a dimension associated with at least one of one or more point coordinates (e.g., a horizontal coordinate and/or a vertical coordinate) or one or more point curvatures measures (e.g., a tangent line slope measure, a heading-invariant orientation measure, and/or the like). In some cases, a scan line intersection point is assigned to a cluster of scan line intersection points based on at least one of: (i) one or more coordinates (e.g., a horizontal coordinate and/or a vertical coordinate) associated with the particular scan line intersection point, or (ii) one or more curvatures measures (e.g., a tangent line slope measure, a heading-invariant orientation measure, and/or the like) associated with the particular scan line intersection point. In some cases, the system clusters a set of scan line intersection points using one or more unsupervised machine learning techniques and/or one or more clustering techniques, such as using the Density-Based Spatial Clustering of Applications with Noise (DBSCAN) technique.

In some cases, after clustering a set of scan line intersection points, an example system may determine whether a number of resulting clusters falls below a threshold (e.g., is lower than two). In some cases, if the number of clusters falls below a threshold, then the system may determine that less than a threshold number of lane marking sequences are detected and/or that the clusters do not correspond to lane marking sequences. The threshold number of lane marking sequences may, for example, be two, to require at least two boundary lane marking sequences. In some cases, if the number of resulting clusters falls below the threshold, the system may determine that the set of scan line intersection points is ineligible for determining lane marking representations in accordance with the techniques described herein. The objective behind refraining from determining lane marking representations if the number of clusters resulting from clustering scan line intersection points falls below a threshold may be to avoid instances in which lane markings are erroneously detected (e.g., based on an assumption that all roads are expected to have at least three lane markings). and/or where there is insufficient data to perform a curve optimization. In some cases, the threshold may be determined based on the drivable surface area. For example, if the drivable surface area is determined to be associated with a region corresponding to a three-lane highway, then the threshold may be set to four.

In some cases, an example system performs two or more successive clustering operations on a set of scan line intersection points in order to determine a set of lane markings based on the set of scan line intersection points. For example, the system may first cluster the set of scan line intersection points based on lateral coordinates to determine clusters of scan line intersection points each corresponding to a sequence of lane markings. Subsequently, the system may cluster the set of scan line intersection points associated with one of the lateral clusters to determine clusters each corresponding to one of the lane markings in a lateral sequence.

In some cases, the techniques described herein include determining a set of lane marking representations based on a set of clusters associated with a set of scan line intersection points. In some cases, a cluster of scan line intersection points is referred to herein as an "intersection point cluster." In some cases, given L intersection point clusters, an example system determines L lane marking representations, where each of the L lane marking representations may be determined based on a respective one of the L intersection point clusters.

In some cases, to determine L lane marking representations based on L intersection point clusters associated with the set of scan line intersection points corresponding to a drivable surface area, an example system selects one of the L intersection point clusters as a primary cluster. For example, the system may determine the cluster associated with a center lane marking (e.g., in a three-marking road) as the primary cluster. As another example, the system may determine the cluster having the highest number of associated scan line intersection points as the primary cluster. As another example, the system may determine the cluster associated with the lowest standard deviation (e.g., as determined based on a distribution of the positions and/or curvature measures associated with the points in the cluster) as the primary cluster. After selecting a primary cluster, the system may then determine a primary lane marking representation based on the primary cluster. For example, the system may determine the primary lane marking representation based on (e.g., by fitting) a parametric curve fitted onto scan line intersection points associated with the primary cluster. In some cases, the system may fit the parametric curve onto the primary cluster points using an iterative optimization technique, for example as an iterative optimization technique whose degrees-of-freedom parameter is determined based on the number of the primary cluster points.

In some cases, to determine L lane marking representations based on L intersection point clusters associated with the set of scan line intersection points corresponding to a drivable surface area, an example system fits a curve (e.g., a polynomial curve) onto each of the L clusters. The system may then select one of the curves (e.g., the center-lane curve) as the primary curve, and encode that curve as a polynomial curve. The system may also encode a non-primary curve based on a linear relationship describing the distance associated with the non-primary curve with the primary curve.

Accordingly, in some cases, to determine L lane marking representations based on L intersection point clusters associated with the set of scan line intersection points corresponding to a drivable surface area, an example system determines a primary lane marking representation based on the primary cluster. In some cases, the system may then determine a secondary lane marking representation based on one of the L−1 secondary clusters based on the primary representation. For example, the system may determine L−1 secondary representations, where each of the L−1 secondary representations may be determined based on one of the L−1 secondary clusters. In some cases, to determine a secondary lane marking representation based on a primary representation, the system may fit an equation (e.g., a linear equation) onto a function that describes a measure of distance (e.g., lateral distance) between positions of the points in the primary cluster and the position of the points in a respective secondary cluster. For example, given a primary cluster $L_1$ and a secondary cluster $L_2$, an example system may fit a linear equation onto the set $\{d(i,L_1), i, j)s.t.i\in L_2\}$, where d(x, y) is a function that determines a measure of shortest distance (e.g., a shortest lateral distance) between a point x and a curve y.

In some cases, the techniques described herein include creating and/or modifying map data associated with an environment based on one or modifications to one or more lane marking representations. In some cases, after determining a lane marking representation, an example system provides an indication of (e.g., a visualization of) the lane marking representation to a user (e.g., a cartographer) and enabling the user to modify the indication. For example, the system may present the lane marking representation to the user using a visualized graph with a set of control points (e.g., a set of control points associated with a polynomial curve or a straight line). The system may then enable the user to move the control points (e.g., to better align the control points with a corresponding lane marking visualization). In some cases, based on determining a movement of a control point by a user, the system may recompute a new lane marking representation for the new set of control points. In some cases, if the moved control point is associated with a primary lane marking representation, the system may recompute a new polynomial curve based on the new set of control points and then determine a set of new linear equations based on the distances (e.g., lateral distances) between the new polynomial curve and other clusters of scan line intersection points. In some cases, after determining a lane marking representation, an example system provides an indication of (e.g., a visualization of) the lane marking representation to an automated system (e.g., a software application). The automated system may then determine a confidence measure associated with the representation. If the confidence measure exceeds a threshold, the system may maintain the representation. If the confidence measure fails to exceed the threshold, the system may reject the representation and/or make one or more modifications to the representation.

In some cases, the techniques described herein include generating (e.g., creating and/or updating) map data associated with a set of vehicles based on the lane marking representations determined in accordance with the techniques described herein. In some cases, the map data may be used to determine at least one of a route or path for the vehicle. In some cases, the map data may be used to control the operation of the vehicle. In some cases, the map data may be presented using a software application, such as a software application executing on a user device (e.g., a personal computer device and/or a smartphone device) and/or a software application executing using a vehicle computing device. In some cases, the map data may be used by a fleet management device that is configured to manage a fleet of vehicles (e.g., a fleet of autonomous vehicles). For example, the fleet management software may be configured to use the map data to determine: (i) which vehicle in the fleet to allocate to a ride request, (ii) how to navigate an allocated vehicle to a requester location, and/or (iii) how to navigate the vehicle to the intended destination after requester pickup.

In some cases, the techniques described herein enable real-time update of map data associated with a vehicle by a vehicle computing device. For example, a vehicle computing device may receive sensor data captured by the corresponding vehicle and/or by one or more other vehicles (e.g., one or more other vehicles that are connected to and/or proximate to the corresponding vehicle). The vehicle computing device may then use the received sensor data to update the map data associated with the vehicle in real-time and use the updated map data to determine a route and/or a path for the vehicle. In some cases, after real-time update of map data, the vehicle computing device may provide the map data to one or more other vehicle computing devices associated with one or (e.g., one or more other vehicles that are connected to and/or proximate to the corresponding vehicle). The other vehicle computing device(s) may then use the received map data to determine route(s) and/or path(s).

In some cases, the techniques described herein enable improve the accuracy of route planning, path determination, and/or trajectory generation for an autonomous vehicle and/or an autonomous vehicles. For example, the techniques described herein increase the likelihood that the route, path, and/or trajectory associated with a vehicle is determined such that the route, path, and/or trajectory respect lane boundary constraints. Accordingly, in some cases, the techniques described herein facilitate and/or enhance safety of automated navigation features in vehicles, such as in automated vehicles or semi-automated vehicles.

In some cases, the techniques described herein can be implemented to provide redundancy to the machine learning system(s) used to detect lane markings in an environment of a vehicle. For example, in some cases, after an example system determines map data associated with an environment, the system may provide the map data to a vehicle computing device. The vehicle computing device may determine, at each time, whether a deviation between lane marking detections by machine learning system(s) used to detect lane markings and lane marking representations represented by the map data exceeds a threshold. In some cases, if such a deviation exceeds a threshold, the system may generate an alert, halt and/or limit autonomous operation of the vehicle, and/or require manual intervention in the vehicle's operation.

The methods, apparatuses, and systems described herein can be implemented in a number of ways. Example implementations are provided below with reference to the following figures. Although discussed in the context of a vehicle, the methods, apparatuses, and systems described herein can be applied to a variety of systems using computer vision techniques, and are not limited to vehicles. Moreover, although various computer vision operations are described as being performed by a mapping component of a backend server system, a person of ordinary skill in the relevant technology will recognize that the mapping component may be deployed on other computing devices, such as on a vehicle computing device and/or on any remote computing device that communicates with a vehicle computing device using a networked connection.

FIG. 1 is a flowchart diagram of an example process 100 for determining a set of lane marking representations based on sensor data associated with an environment. As depicted in FIG. 1, at operation 102, an example system determines a drivable surface area polygon based on sensor data associated with the environment (e.g., sensor data captured in relation to a vehicle traveling a path in the environment). The drivable surface area polygon may include at least a portion (e.g., all) of the area associated with at least a drivable surface area in an environment.

As depicted in FIG. 1, an example of a drivable surface area polygon is polygon 114 that is associated with the drivable surface area associated with an environment. As further depicted in FIG. 2, the drivable surface area is also associated with a center lane marking 116, a right lane marking 118, and a left lane marking 120.

At operation 104, the system determines a representative line associated with the drivable surface area polygon. The representative line may be a line that extends longitudinally along the polygon and/or along the corresponding drivable surface area. In some cases, the representative lane is a medial axis line associated with the polygon, such as a medial axis line determined based on a Voronoi diagram associated with the polygon. For example, as depicted in FIG. 1, the polygon 114 is associated with the representative line 122, which is the medial axis line associated with the polygon 114.

At operation 106, the system determines a set of scan lines that extend laterally from a set of points associated with the representative line. In some cases, the set of scan lines may be perpendicular to the representative line at a set of points on the representative line. For example, as depicted in FIG. 1, the system has determined two scan lines: a scan line 124 that is perpendicular to the representative line 122 at a point 128, and a scan line 126 that is perpendicular to the representative line 122 at a point 130. In some cases, the length of a scan line may be determined based on the drivable surface area geometry of a region associated with the corresponding representative line point. For example, the scan line length may be determined based on a width of the drivable area in the corresponding region.

At operation 108, the system determines a set of scan line intersection points associated with the intersections of the set of scan lines with the lane markings associated with the corresponding drivable surface area. In some cases, a scan line intersection point is associated with the intersection of a respective one of the scan lines perpendicular to the representative line and a lane marking.

For example, as depicted in FIG. 1, the scan line 124, which intersects with the representative line 122 at the point 128, intersects with the center lane marking 116 at the point 132, with the right lane marking 118 at the point 136, and with the left lane marking 120 at the point 140. Moreover, as further depicted in FIG. 1, the scan line 126, which intersects with the representative line 122 at the point 130, intersects with the center lane marking 116 at the point 134, with the with the right lane marking 118 at the point 138, and with the left lane marking 120 at the point 142.

At operation 110, the system clusters the scan line intersection points to a set of point clusters. In some cases, the system may cluster the scan line intersection points based on the positions (e.g., lateral and/or longitudinal positions) associated with the scan line intersection points, curvature measures (e.g., heading-invariant orientation measures, tangent line slope measures, and/or the like) associated with the scan line intersection points, and/or the like. As depicted in FIG. 1, the system has clustered the scan line intersection points 132-142 into three clusters: cluster 144 including the point 132 and the point 134 which were associated with the center lane marking 116, cluster 146 including the point 136 and the point 138 which were associated with the right lane marking 118, and cluster 148 including the point 140 and the point 142 associated with the left lane marking 120.

At operation 112, the system determines lane marking representations based on the point clusters. In some cases, given L clusters, the system determines L corresponding lane marking representations, each based on one of the L clusters. In some cases, determining lane marking representations based on point clusters may be performed in accordance with the techniques described below in relation to FIG. 2.

For example, in FIG. 1, a first lane marking representation may be determined based on cluster 144 that includes the scan line intersection points 132 and 134, a second lane marking representation may be determined based on cluster 146 that includes the scan line intersection points 136 and 138, and a third lane marking representation may be determined based on cluster 146 that includes the scan line intersection points 140 and 142.

In some cases, the system determines the lane marking representation associated with a cluster (e.g., for a primary cluster, such as a cluster associated with the scan line intersection points related to the center lane marking) based on an optimal polynomial curve fitted onto the cluster (e.g., a polynomial curve having the minimal distance to the scan line intersection points in the primary cluster). For example, in FIG. 1, a lane marking representation associated with the center lane marking 116 may be determined by fitting a polynomial equation onto the cluster 144 that includes the scan line intersection points 132 and 134.

As another example, in FIG. 1, the system determines the lane marking representation associated with a cluster (e.g., a secondary cluster, such as a cluster associated with the scan line intersection points related to the left and/or right lane marking) based on an optimal linear equation fitted onto the distances between the points in the cluster and a curve (e.g., a polynomial curve, a clothoid and/or a Euler spiral, a Bézier curve, and/or the like) associated with another cluster primary cluster, such as a cluster associated with the scan line intersection points related to the center lane marking). For example, in FIG. 1, a lane marking representation associated with the right lane marking 118 may be determined by a fitting a linear equation onto a distance between the points in the cluster 146 (which includes the scan line intersection points 136 and 138) and the cluster 144 (which includes the scan line intersection points 132 and 134). As another example, a lane marking representation associated with the left lane marking 120 may be determined by a fitting a linear equation onto a distance between the points in the cluster 146 (which includes the scan line intersection points 140 and 42) and the cluster 144 (which includes the scan line intersection points 132 and 134).

Figure 2:
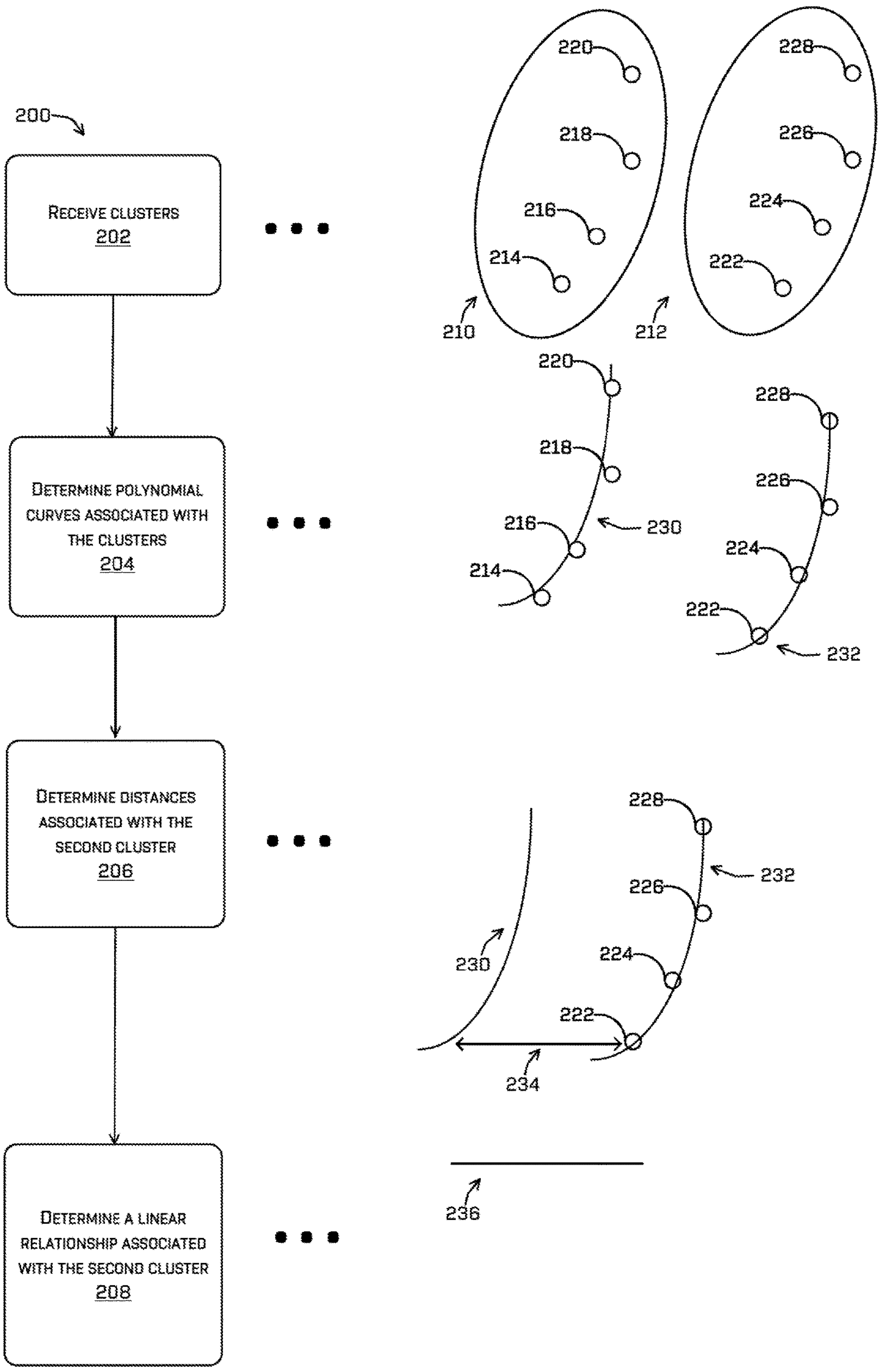
FIG. 2 is a flowchart diagram of an example process for determining a set of lane marking representations based on clusters of scan line intersection points.

FIG. 2 is a flowchart diagram of an example process 200 for determining a set of lane marking representations based on clusters of scan line intersection points. As depicted in FIG. 2, at operation 202, an example system receives a set of point clusters. Each point cluster may include a group of scan line intersection points that are determined via performing a clustering operation on a set of scan line intersection points. Each scan line intersection point may be a point of intersection of a scan line that is perpendicular to a representative line associated with a drivable surface area polygon and a lane marking detection associated with the corresponding drivable surface area.

For example, as depicted in FIG. 2, the system may receive a first point cluster 210 that includes the scan line intersection point 214, the scan line intersection point 216, the scan line intersection point 218, and the scan line intersection point 220. Moreover, the system may receive a second point cluster 212 that includes the scan line intersection point 222, the scan line intersection point 224, the scan line intersection point 226, and the scan line intersection point 228.

At operation 204, the system determines a polynomial curve associated with each point cluster. For example, as depicted in FIG. 2, the system has fitted the polynomial curve 230 on to the scan line intersection points associated with that point cluster 210. Moreover, the system has fitted the polynomial curve 232 on the scan line intersection points associated with the point cluster 212.

At operation 206, the system determines distances associated with a primary polynomial curve and a secondary polynomial curve. For example, as depicted in FIG. 2, the system has selected the curve 230 as the primary curve and determined a set of shortest distances (e.g., the distance 234) between the curve 230 and the curve 232.

At operation 208, the system determines a linear relationship associated with the second cluster based on the determined distances. In some cases, the system fits an optimal linear equation onto a function that maps points in the second cluster to their respective shortest distances with respect to the first cluster. For example, as depicted in FIG. 2, the system has mapped the distances between the polynomial curve 230 and the polynomial curve 232 to the linear equation associated with the line 236.

FIG. 3 is a flowchart diagram of an example process 300 for determining a primary lane marking representation and a secondary lane marking representation based on sensor data associated with an environment. As depicted in FIG. 3, at operation 302, an example system receives sensor data (e.g., lidar data, image data, radar data) associated with an environment. The environment may be an area within which a vehicle has traversed a path.

At operation 304, the system determines a polygon based on a drivable surface area associated with the environment. The drivable surface area may include both junction and non-junction roadways.

At operation 306, the system determines a representative line associated with the drivable surface area polygon. In some cases, the system determines the representative line based on a medial axis associated with the drivable surface area polygon, for example a medial axis determined based on a Voronoi diagram associated with the drivable surface area polygon.

At operation 308, the system determines a set of points along the representative line. In some cases, the system determines a sequence of points, where the distance between each successive two points in the sequence may be fixed (e.g., may be defined by a system hyperparameter). In some cases, the set of points along the representative line may be evenly spaced.

At operation 310, the system determines a set of scan lines that are perpendicular to the representative line at the determined set of points. In some cases, each scan line is a line that is perpendicular to the representative at one of the set of points determined along the representative line. In some cases, each scan line may intersect with one or more lane marking detections.

At operation 312, the system determines a set of scan line intersection points. A scan line intersection point may be a point associated with the intersection of a scan line with a detected lane marking. In some cases, the system may determine that a scan line intersects with a detected lane marking if the shortest longitudinal distance between the scan line and the detected lane marking falls below a threshold (e.g., is zero).

At operation 314, the system determines a primary cluster associated with a first lane marking. In some cases, the system clusters the set of scan line intersection points and selects one of those clusters as the primary cluster. For example, the system may select a cluster that is determined to be associated with a center lane marking as the primary cluster.

At operation 316, the system determines a secondary cluster associated with a second lane marking. In some cases, after clustering the set of scan line intersection points, the system selects a cluster that is determined to not be associated with a center lane marking (e.g., a left or right lane marking) as a secondary cluster. In some cases, after clustering the set of scan line intersection points and selecting a primary cluster, the system selects a cluster that is not determined to be a primary cluster as a secondary cluster.

At operation 318, the system determines a first lane marking representation associated with the first lane marking based on the first cluster. In some cases, the system determines the first lane marking representation by fitting an optimal equation (e.g., an optimal polynomial equation, such as an optimal polynomial curve) on the scan line intersection points associated with the first cluster.

At operation 320, the system determines a second lane marking representation associated with the second lane marking based on the second cluster and the first lane marking representation. In some cases, the system determines the second lane marking representation by fitting an optimal equation (e.g., an optimal linear equation) on the distances between the scan line intersection points associated with the second cluster and the first lane marking representation. For example, the system may determine the second lane marking representation by fitting an optimal equation (e.g., an optimal linear equation) on the distances between the scan line intersection points associated with the second cluster and a polynomial curve fitted onto the scan line intersection points associated with the first cluster.

Figure 4:
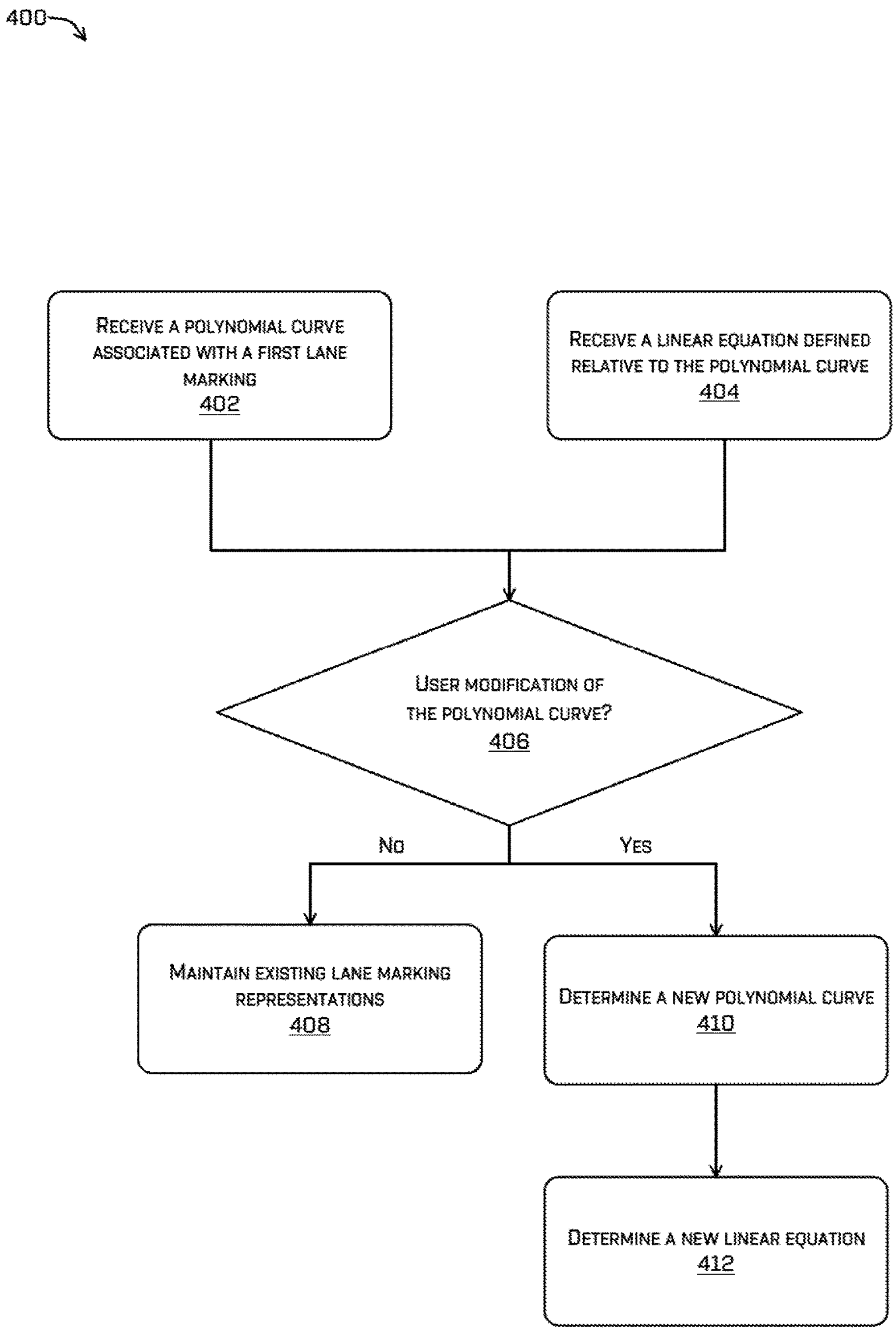
FIG. 4 is a flowchart diagram of an example process for updating a set of lane marking representations based on user feedback.

FIG. 4 is a flowchart diagram of an example process 400 for updating a set of lane marking representations based on user feedback. For example, the process 400 may be used to update a set of lane marking representations based on a cartographer feedback.

As depicted in FIG. 4, at operation 402, an example system receives a polynomial curve associated with a first lane marking. The polynomial curve may be determined by a fitting an optimal curve onto the points associated with a primary cluster of scan line intersection points (e.g., a cluster of scan line intersection points associated with a center lane marking of a set of lane markings).

At operation 404, the system receives a linear equation defined relative to the received polynomial curve. In some cases, the linear equation may determine a property of a second cluster of scan line intersection points that is determined relative to the polynomial curve associated with a primary cluster of scan line intersection points. For example, the linear equation may be determined by fitting an equation onto the shortest longitudinal distances between the points in the second cluster and the polynomial curve associated with the first cluster.

At operation 406, the system determines whether a user has provided feedback modifying a control point associated with the polynomial curve. If the system determines that the user has not provided such feedback (operation 406—No), the system proceeds to operation 408 to determine that no change in the set of lane marking representations is needed. The system may then maintain the existing lane marking representations.

If the system determines that the user has provided feedback modifying a control point associated with the polynomial curve (operation 406—Yes), the system proceeds to operation 410 to determine a new polynomial curve. The system may fit a new optimal polynomial curve onto a set of points that include the scan line intersection points associated with the corresponding primary cluster as well as the newly-set control point. After operation 410, the system may proceed to operation 412.

At operation 412, the system may determine a new linear equation based on the new polynomial curve. For example, the new equation may be determined by fitting an equation onto the shortest longitudinal distances between the points in the second cluster and the new polynomial curve as determined based on the first cluster and the user feedback.

Figure 5:
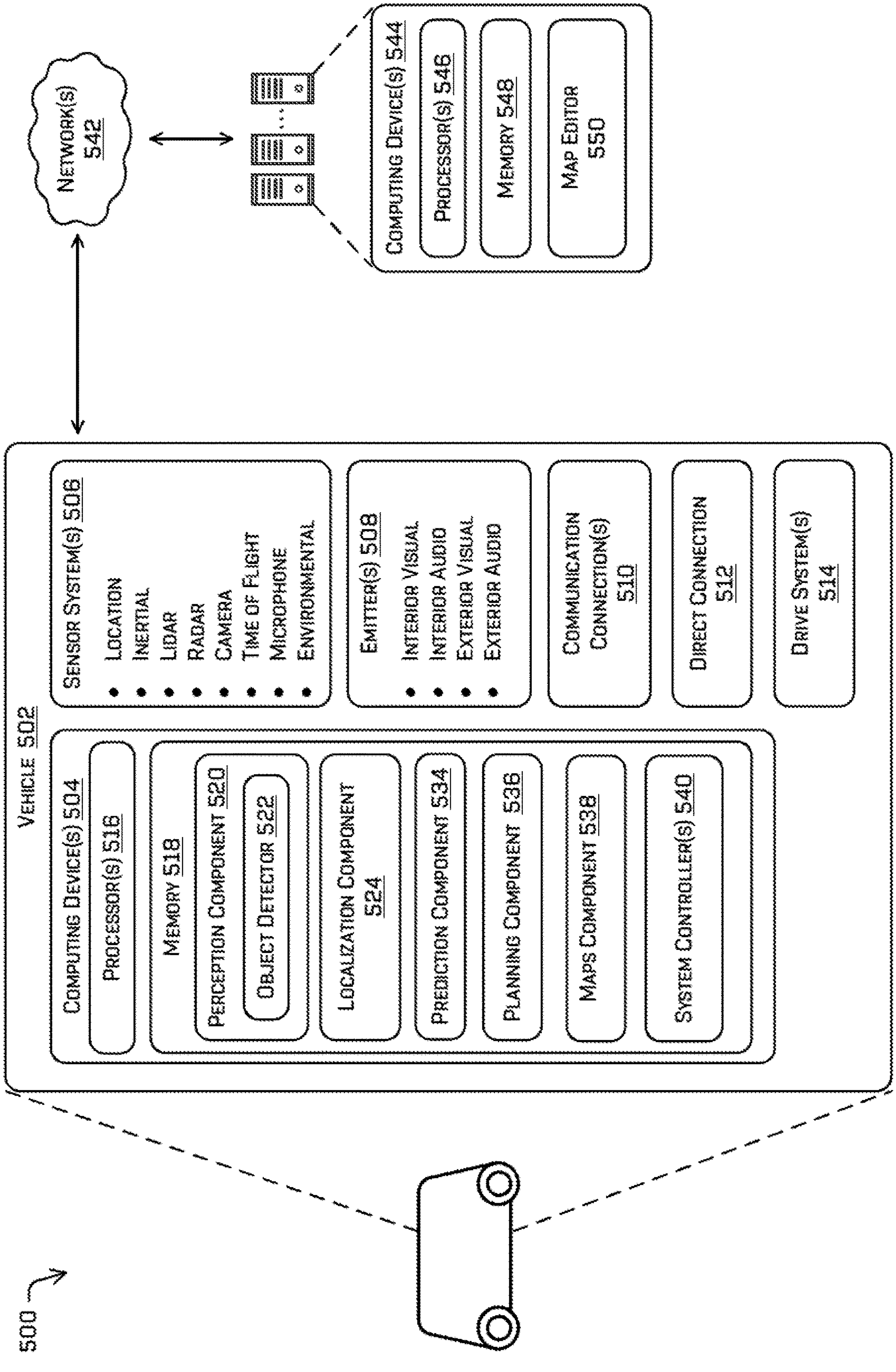
FIG. 5 depicts a block diagram of an example system for implementing the techniques described herein.

FIG. 5 depicts a block diagram of an example system 500 for implementing the techniques described herein. In at least one example, the system 500 can include a vehicle 502. In the illustrated example system 500, the vehicle 502 is an autonomous vehicle; however, the vehicle 502 can be any other type of vehicle.

The vehicle 502 can be a driverless vehicle, such as an autonomous vehicle configured to operate according to a Level 4 and/or Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 502 can include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 can be configured to capture sensor data associated with an environment.

The one or more sensor system(s) 506 can include time-of-flight sensors, location sensors (e.g., GPS, compass, etc.), inertial sensors (e.g., sensor including inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, ball joint sensors, chassis position sensors, etc. The one or more sensor system(s) 506 can include multiple instances of any of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The one or more sensor system(s) 506 can provide input to the computing device 504.

The vehicle 502 can also include one or more emitter(s) 508 for emitting light and/or sound. The one or more emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include one or more communication connection(s) 510 that enable communication between the vehicle 502 and one or more other local or remote computing device(s) (e.g., a remote teleoperation computing device) or remote services. For instance, the one or more communication connection(s) 510 can facilitate communication with other local computing device(s) on the vehicle 502 and/or the one or more drive system(s) 514. Also, the one or more communication connection(s) 510 can allow the vehicle 502 to communicate with other nearby computing device(s) (e.g., other nearby vehicles, traffic signals, etc.).

The one or more communications connection(s) 510 can include physical and/or logical interfaces for connecting the computing device 504 to another computing device or one or more external networks 542 (e.g., the Internet). For example, the one or more communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 502 can include one or more drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) 506 on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) 506 and to control operation of the various vehicle systems. In some examples, the drive system controller can include one or more processor(s) and memory communicatively coupled with the one or more processor(s). The memory can store one or more components or computer-executable instructions to perform or otherwise cause various functionalities of the drive system(s) 514. Furthermore, the drive system(s) 514 also include one or more communication connection(s) that enable communication by the respective drive system with one or more other local or remote computing device(s).

The computing device 504 can include one or more processor(s) 516 and memory 518 communicatively coupled with the one or more processor(s) 516. In the illustrated example, the memory 518 of the computing device 504 stores a perception component 520, a localization component 524, a prediction component 534, a planning component 536 (or "planner"), a maps component 538, and one or more system controller(s) 540. Though depicted as residing in the memory 518 for illustrative purposes, it is contemplated that the perception component 520, the localization component 524, the prediction component 534, the planning component 536, the maps component 538, and the one or more system controller(s) 540 can additionally, or alternatively, be accessible to the computing device 504 (e.g., stored in a different component of vehicle 502) and/or be accessible to the vehicle 502 (e.g., stored remotely).

The perception component 520 can include functionality to perform object detection, segmentation, and/or classification. In some examples, the perception component 520 and/or the object detector 522 can provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 520 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In one example, the perception component 520 may detect a ground surface and determine a ride height based on sensor data.

Further, the perception component 520 can include functionality to store perception data generated by the perception component 520. In some instances, the perception component 520 can determine a track corresponding to an object that has been classified as an object type. For purposes of illustration only, the perception component 520, using sensor system(s) 506 can capture one or more images of an environment, which may be used to determine information about an environment.

The stored perception data can, in some examples, include fused perception data captured by the vehicle. Fused perception data can include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

In general, the object detector 522 can detect (among other things) semantic objects represented by sensor data. In some examples, the object detector 522 can identify such semantic objects and can determine a two-dimensional or a three-dimensional bounding box associated with the object. The object detector 522 can determine additional information such as a location, orientation, pose, and/or size (e.g., length, width, height, etc.) associated with the object. The object detector 522 can send data to other components of the system 500 for localization and/or determining calibration information, as discussed herein.

The localization component 524 can include functionality to receive data from the sensor system(s) 506 and/or other components to determine a position of the vehicle 502. In addition, the localization component 524 can include and/or request/receive a three-dimensional map of an environment and can continuously determine a location of the autonomous vehicle within the map. In some instances, the localization component 524 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 524 can provide data to various components of the vehicle 502 to determine an initial position of an autonomous vehicle for generating a trajectory or for initial calibration. In examples of this disclosure, the localization component 524 may determine a position of the vehicle 502, and the position may be used to determine a tile included in spatially indexed tiles associated with a total drivable surface boundary.

The prediction component 534 can generate one or more probability maps representing prediction probabilities of possible locations of one or more objects in an environment. For example, the prediction component 534 can generate one or more probability maps for vehicles, pedestrians, animals, and the like within a threshold distance from the vehicle 502. In some instances, the prediction component 534 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 536 can determine a path for the vehicle 502 to follow to traverse through an environment. For example, the planning component 536 can determine various routes and paths and various levels of detail. In some instances, the planning component 536 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 536 can generate an instruction for guiding the autonomous vehicle along at least a portion of the route from the first location to the second location. In at least one example, the planning component 536 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle. In some examples, the planning component 536 may determine a path based on boundary data determined from the total drivable surface boundary 128/228 (e.g., boundary location, boundary type, etc.).

In some examples, the planning component 536 can alternatively, or additionally, use data from the perception component 520 and/or the prediction component 534 to determine a path for the vehicle 502 to follow to traverse through an environment. For example, the planning component 536 can receive data from the perception component 520 and/or the prediction component 534 regarding objects associated with an environment. Using this data, the planning component 536 can determine a route to travel from a first location (e.g., a current location) to a second location (e.g., a target location) to avoid objects in an environment. In at least some examples, such a planning component 536 may determine there is no such collision free path and, in turn, provide a path which brings vehicle 502 to a safe stop avoiding all collisions and/or otherwise mitigating damage.

The memory 518 can further include a maps component 538 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some examples, map data can include the spatially indexed tiles, as well as in-memory data. A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In some examples, the vehicle 502 can be controlled based at least in part on the map(s) component 538. That is, the map(s) component 538 can be used in connection with the perception component 520 (and sub-components), the localization component 524 (and sub-components), the prediction component 534, and/or the planning component 536 to determine a location of the vehicle 502, identify objects in an environment, generate prediction probabilit(ies) associated with objects and/or the vehicle 502, and/or generate routes and/or trajectories to navigate within an environment.

In at least one example, the computing device 504 can include one or more system controller(s) 540, which can be configured to control steering, propulsion, braking, safety, emitters, communication, and other systems of the vehicle 502. These system controller(s) 540 can communicate with and/or control corresponding systems of the drive system(s) 514 and/or other components of the vehicle 502, which may be configured to operate in accordance with a path provided from the planning component 536.

The vehicle 502 can connect to computing device(s) 544 via network 542 and can include one or more processor(s) 546 and memory 548 communicatively coupled with the one or more processor(s) 546. In at least one instance, the one or more processor(s) 546 can be similar to the processor(s) 516 and the memory 548 can be similar to the memory 518. In some examples, the memory 548 may include a maps editor 550 for generating map data including lane marking representations, for example in accordance with the techniques described above with reference to FIGS. 2-4.

The processor(s) 516 of the computing device 504 and the processor(s) 546 of the computing device(s) 544 can be any suitable processor capable of executing instructions to process data and perform operations as described herein. By way of example and not limitation, the processor(s) 516 and 546 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors as far as they are configured to implement encoded instructions.

The memory 518 computing device 504 and the memory 548 of the computing device(s) 544 are examples of non-transitory computer-readable media. The memory 518 and 548 can store an operating system and one or more software applications, computer-executable instructions, programs, and/or data to implement the methods described herein and the functions attributed to the various systems. In various implementations, the memory 518 and 548 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 518 and 548 can be implemented as a neural network. In some examples, a machine learned model could be trained to determine total drivable surface boundaries or locations of boundaries relative to vehicle pose.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

EXAMPLE CLAUSES

A: A system comprising: one or more processors; and one or more non-transitory computer-readable media storing computer-executable instructions that, when executed, cause the one or more processors to perform operations comprising: receiving sensor data associated with a vehicle traversing an environment along a path; one or more of receiving or determining, based on the sensor data, a lane boundary associated with the path; determining, based at least in part on a set of drivable areas detected while traversing the path, a polygon; determining a representative line associated with the polygon; determining a set of points along the representative line; determining a set of intersections of a set of lines with the lane boundary, a line of the set of lines originating at a point of the set of points and extending laterally from the representative line; determining, based on the set of intersections, a representation of the lane boundary; associating the representation of the lane boundary with a map; and providing the map to a second system, wherein the second system is configured to control an autonomous vehicle based on the map.

B: The system of paragraph A, wherein determining the representative line comprises: determining a medial axis associated with the polygon.

C: The system of paragraph A or B, wherein determining the representation of the lane boundary is further based at least in part on: a curvature of the lane boundary.

D: The system of any of paragraphs A-C, the operations further comprising: removing a portion of the representative line associated with a junction.

E: The system of any of paragraphs A-D, wherein: determining the representation of the lane boundary comprises determining, based at least in part on a cluster that is determined based at least in part on the set of intersections, a polynomial curve having a minimal distance to the cluster.

F: One or more non-transitory computer-readable media storing instructions executable by one or more processors, wherein the instructions, when executed, cause the one or more processors to perform operations comprising: receiving first data associated with a drivable surface associated with a road; determining, based on the first data, a reference line associated with the drivable surface, wherein the reference line traverses along the road; determining, based on the reference line, a first representation of a lane boundary; associating the first representation with a map; and providing the map to a system configured to control a vehicle based on the map.

G: The one or more non-transitory computer-readable media of paragraph F, wherein determining the first representation comprises: determining a line that intersects with the reference line at a first point and a lane boundary associated with the road at a second point; determining a second line that intersects with the reference line at a third point; determining that the second line intersects with the lane boundary at a fourth point; and determining the first representation based at least in part on the second point and the fourth point.

H: The one or more non-transitory computer-readable media of paragraph F or G, wherein determining the first representation comprises: determining a line that intersects with the reference line at a first point and a lane boundary associated with the road at a second point; determining that the line intersects with a second lane boundary at a third point; determining, based at least in part on the first point and the third point, a distance between the lane boundary and the second lane boundary; and determining that the distance falls below a threshold.

I: The one or more non-transitory computer-readable media of any of paragraphs F-H, the operations further comprising: determining a line that intersects with the reference line at a first point and a lane boundary associated with the road at a second point; receiving an indication of a user input representing that the line intersects with the lane boundary at a third point; based on receiving the indication, determining a second representation associated with the lane boundary based at least in part on the third point; and associating the map with the second representation.

J: The one or more non-transitory computer-readable media of any of paragraphs F-I, wherein determining the first representation is based on a line that is perpendicular to the reference line.

K: The one or more non-transitory computer-readable media of any of paragraphs F-J, wherein determining the reference line comprises: determining, based on the first data, a set of features; determining, based at least in part on the set of features, a polygon that comprises a drivable surface associated with the road; determining a medial axis associated with the polygon; and determining the reference line based on the medial axis.

L: The one or more non-transitory computer-readable media of paragraph K, the operations further comprising removing a portion of the reference line that is associated with a a junction.

M: The one or more non-transitory computer-readable media of any of paragraphs F-L, wherein determining the first representation comprises: determining a line that intersects with the reference line at a first point and a lane boundary associated with the road at a second point; determining that a second line intersects with the lane boundary at a third point; and determining an optimal polynomial curve based on the second point and the third point.

N: The one or more non-transitory computer-readable media of any of paragraphs F-M, wherein determining the first representation based on a curvature associated with the lane boundary.

O: A method comprising: receiving first data associated with a drivable surface associated with a road; determining, based on the first data, a reference line associated with the drivable surface, wherein the reference line traverses along the road; determining, based on the reference line, a first representation of a lane boundary; associating the first representation with a map; and providing the map to a system configured to control a vehicle based on the map.

P: The method of paragraph O, wherein determining the first representation comprises: determining a line that intersects with the reference line at a first point and a lane boundary associated with the road at a second point; determining a second line that intersects with the reference line at a third point; determining that the second line intersects with the lane boundary at a fourth point; and determining the first representation based at least in part on the second point and the fourth point.

Q: The method of paragraph O or P, wherein determining the first representation comprises: determining a line that intersects with the reference line at a first point and a lane boundary associated with the road at a second point; determining that the line intersects with a second lane boundary at a third point; determining, based at least in part on the first point and the third point, a distance between the lane boundary and the second lane boundary; and determining that the distance falls below a threshold.

R: The method of any of paragraphs O-Q, further comprising: determining a line that intersects with the reference line at a first point and a lane boundary associated with the road at a second point; receiving an indication of a user input representing that the line intersects with the lane boundary at a third point; based on receiving the indication, determining a second representation associated with the lane boundary based at least in part on the third point; and associating the map with the second representation.

S: The method of any of paragraphs O-R, wherein determining the first representation is based on a line that is perpendicular to the reference line.

T: The method of any of paragraphs O-S, wherein determining the reference line comprises: determining, based on the first data, a set of features; determining, based at least in part on the set of features, a polygon that comprises a drivable surface associated with the road; determining a medial axis associated with the polygon; and determining the reference line based on the medial axis.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing computer-executable instructions that, when executed, cause the one or more processors to perform operations comprising:

receiving sensor data associated with a vehicle traversing an environment along a path;

one or more of receiving or determining, based on the sensor data, a lane boundary associated with the path;

determining, based at least in part on a set of drivable areas detected while traversing the path, a polygon;

determining a representative line associated with the polygon;

determining a set of points along the representative line;

determining a set of intersections of a set of lines with the lane boundary, a line of the set of lines originating at a first point of the set of points and extending laterally from the representative line;

determining that the line that intersects with the representative line at a second point and the lane boundary at a third point;

receiving an indication of a user input representing that the line intersects with the lane boundary at a fourth point;

determining, based on the set of intersections and the indication, a representation of the lane boundary;

associating the representation of the lane boundary with a map; and providing the map to a second system, wherein the second system is configured to generate a trajectory based on the map and control a movement of the vehicle or a second vehicle based on the trajectory.

2. The system of claim 1, wherein determining the representative line comprises:

determining a medial axis associated with the polygon.

3. The system of claim 1, wherein determining the representation of the lane boundary is further based at least in part on:

a curvature of the lane boundary.

4. The system of claim 1, the operations further comprising:

removing a portion of the representative line associated with a junction.

5. The system of claim 1, wherein:

determining the representation of the lane boundary comprises determining, based at least in part on a cluster that is determined based at least in part on the set of intersections, a polynomial curve having a minimal distance to the cluster.

6. One or more non-transitory computer-readable media storing instructions executable by one or more processors, wherein the instructions, when executed, cause the one or more processors to perform operations comprising:

receiving first data associated with a drivable surface associated with a road;

determining, based on the first data, a reference line associated with the drivable surface, wherein the reference line traverses along the road;

determining a line that intersects with the reference line at a first point and a lane boundary at a second point;

receiving an indication of a user input representing that the line intersects with the lane boundary at a third point;

determining, based on the reference line and the indication, a first representation of the lane boundary;

associating the first representation with a map; and providing the map to a system configured to generate a trajectory based on the map and control a movement of a vehicle based on the trajectory.

7. The one or more non-transitory computer-readable media of claim 6, wherein determining the first representation comprises:

determining a second line that intersects with the reference line at a fourth point;

determining that the second line intersects with the lane boundary at a fifth point; and determining the first representation based at least in part on the second point and the fifth point.

8. The one or more non-transitory computer-readable media of claim 6, wherein determining the first representation comprises:

determining that the line intersects with a second lane boundary at a fourth point;

determining, based at least in part on the first point and the fourth point, a distance between the lane boundary and the second lane boundary; and determining that the distance falls below a threshold.

9. The one or more non-transitory computer-readable media of claim 6, wherein determining the first representation is based on a second line that is perpendicular to the reference line.

10. The one or more non-transitory computer-readable media of claim 6, wherein determining the reference line comprises:

determining, based on the first data, a set of features;

determining, based at least in part on the set of features, a polygon that comprises the drivable surface;

determining a medial axis associated with the polygon; and determining the reference line based on the medial axis.

11. The one or more non-transitory computer-readable media of claim 10, the operations further comprising removing a portion of the reference line that is associated with a junction.

12. The one or more non-transitory computer-readable media of claim 6, wherein determining the first representation comprises:

determining that a second line intersects with the lane boundary at a fourth point; and determining an optimal polynomial curve based on the second point and the fourth point.

13. The one or more non-transitory computer-readable media of claim 6, wherein determining the first representation is based on a curvature associated with the lane boundary.

14. A method comprising:

receiving first data associated with a drivable surface associated with a road;

determining, based on the first data, a reference line associated with the drivable surface, wherein the reference line traverses along the road;

determining a line that intersects with the reference line at a first point and a lane boundary at a second point;

receiving an indication of a user input representing that the line intersects with the lane boundary at a third point;

determining, based on the reference line and the indication, a first representation of the lane boundary;

associating the first representation with a map; and providing the map to a system configured to generate a trajectory based on the map and control a movement of a vehicle based on the trajectory.

15. The method of claim 14, wherein determining the first representation comprises:

determining a second line that intersects with the reference line at a fourth point;

determining that the second line intersects with the lane boundary at a fifth point; and determining the first representation based at least in part on the second point and the fifth point.

16. The method of claim 14, wherein determining the first representation comprises:

determining that the line intersects with a second lane boundary at a fourth point;

determining, based at least in part on the first point and the fourth point, a distance between the lane boundary and the second lane boundary; and determining that the distance falls below a threshold.

17. The method of claim 14, further comprising:
determining a second representation associated with the lane boundary based at least in part on the reference line; and
determining the first representation based on the indication and the second representation.

18. The method of claim 14, wherein determining the first representation is based on a second line that is perpendicular to the reference line.

19. The method of claim 14, wherein determining the reference line comprises:
determining, based on the first data, a set of features;
determining, based at least in part on the set of features, a polygon that comprises the drivable surface;
determining a medial axis associated with the polygon; and
determining the reference line based on the medial axis.

* * * * *